United States Patent
Gay-Bellile et al.

(10) Patent No.: US 7,085,326 B1
(45) Date of Patent: Aug. 1, 2006

(54) TRANSMISSION SYSTEM, RECEIVER, AND DECIMATION DEVICE

(75) Inventors: Olivier Gay-Bellile, Paris (FR); Eric Dujardin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/568,060

(22) Filed: May 10, 2000

(30) Foreign Application Priority Data

May 11, 1999 (FR) .................................. 99 06021

(51) Int. Cl.
*H04L 27/00* (2006.01)
(52) U.S. Cl. .................. 375/259; 375/316; 370/395.4; 370/458; 708/313; 714/21; 714/746
(58) Field of Classification Search ................. 340/2.4, 340/3.21; 375/136, 138, 147, 240.02, 240.12, 375/259, 263, 240, 316, 224, 340, 228, 260; 370/232, 233, 234, 236.1, 253, 395.4, 376, 370/458, 459, 508; 708/313; 714/1, 21, 714/746, 799

See application file for complete search history.

(56) References Cited

U.S. PATENT DOCUMENTS

| | | | |
|---|---|---|---|
| 3,810,103 A | | 5/1974 | Ricci .......................... 340/172.5 |
| 5,612,948 A | * | 3/1997 | Fette et al. .................. 370/252 |
| 5,812,608 A | * | 9/1998 | Valimaki et al. ............ 375/331 |
| 6,064,662 A | * | 5/2000 | Gitlin et al. ................. 370/330 |
| 6,370,160 B1 | * | 4/2002 | Knutson et al. ............ 370/503 |
| 6,590,872 B1 | * | 7/2003 | Shiue et al. ................. 370/314 |

FOREIGN PATENT DOCUMENTS

| | | | |
|---|---|---|---|
| EP | 0793363 A2 | * | 3/1997 |
| WO | 9812836 A1 | | 3/1998 |

OTHER PUBLICATIONS

Gay-Bellile, O, Dujardin E. ("Architecture of a Programmable FIR Filter CO-Processor", May 31, 1998. ISCAS '98, pp. 433-436, vol. 5).*

* cited by examiner

*Primary Examiner*—Jean B. Corrielus
(74) *Attorney, Agent, or Firm*—Larry Liberchuk

(57) ABSTRACT

The invention presents a programmable communication system for generating data for at least one processing unit at a fixed symbol frequency, which lies within a range of frequencies, on the basis of input samples received at an input frequency higher than the symbol frequency. To achieve this, communication time slots are reserved periodically as a function of the maximum envisaged symbol frequency, and the device is designed for using only a fraction of these slots reserved as a function of the fixed symbol frequency for transmitting the generated data. The invention is applicable to broadband digital communications, digital television, channel decoding, demodulation and other similar technology areas.

20 Claims, 1 Drawing Sheet

TRANSMISSION SYSTEM, RECEIVER, AND DECIMATION DEVICE

FIELD OF THE INVENTION

The invention relates to a transmission system comprising at least a transmitter and a receiver, said receiver comprising decimation means for generating data at a symbol frequency on the basis of input samples which have an input frequency higher than the symbol frequency, while using communication slots reserved periodically for transmitting the generated data.

It also relates to a receiver and a decimation device for generating data at a symbol frequency on the basis of input samples which have an input frequency higher than the symbol frequency, while using communication slots reserved periodically for transmitting the generated data.

It has numerous applications, in particular in broadband digital communication systems such as digital cable or satellite television.

BACKGROUND OF THE INVENTION

U.S. Pat. No. 3,810,103 describes a dynamic communication system between a transmitter and a receiver which uses acknowledgement means in the form of a transmission of flags to indicate whether the receiver is ready to receive data, whether data have been transmitted by the transmitter, and whether the receiver has correctly received the transmitted data.

SUMMARY OF THE INVENTION

The present invention has for its object to provide a communication system which is programmable as a function of the envisaged application and which has a static architecture, i.e. which can support communications at various frequencies, but whose behavior is independent of the data to be transmitted, so that it can be easily validated. The cited patent describes a system provided for dynamic communications where the behavior is highly dependent on the transmitted data. It accordingly does not provide a solution to the problem posed by the invention.

In multiple access transmission systems, several transmitters share the same resource of a communication medium. In time division multiple access systems, time slots are reserved by the transmitters in order to transport their information data via the medium, towards the receivers addressed. When all communications are known in advance, time slots may be allocated according to a static pattern, for each transmitter. This prevents any conflict occurring. But when all communications are not predictable, particularly when the output symbol frequency may vary in time, the totally static scheme is not usable any more.

An object of the invention is to introduce a degree of dynamism into an architecture of the static kind, in order to be able to generate various output frequencies that may vary in time.

A transmission system, a receiver, and a decimation device according to the invention and mentioned in the opening paragraphs are characterized in that a fraction of said reserved slots is used for transmitting said data.

Decimation devices are well known in demodulators of digital transmission systems. They reduce the frequency of the received data that have been previously over-sampled. Here, the term decimation device is employed in a very wide sense, to indicate any device which is designed to reduce the frequency of received data.

According to the invention, the frequency of received data is reduced by using a fraction of reserved slots for transmitting the received data.

According to a major characteristic of the invention, the decimation device comprises means for transmitting a validity information associated with the data transmitted in said reserved slots.

Therefore, the data destined to be further processed are transmitted with an extra information added, to indicate to further processing members whether the transmitted data are usable or not. The addition of this piece of information to the transmitted data allows to reduce the frequency of said transmitted data without modifying the allocation plan of the shared medium. When a slot contains an information flag indicating that the slot does not contain data to be processed, i.e. valid data, this slot is to be considered as if it does not contain any data at all.

According to another characteristic, the decimation device being designed to generate data at the symbol frequency to at least one processing unit controlled by a control member, the invention is characterized in that said control member comprises detection means for said validity information so as to prevent the processing of associated data by said processing unit.

BRIEF DESCRIPTION OF THE DRAWINGS

The following description given with reference to the annexed drawings, all by way of non-limitative example, will render it clear how the invention may be put into practice.

DESCRIPTION OF THE EMBODIMENTS

Figure 1:
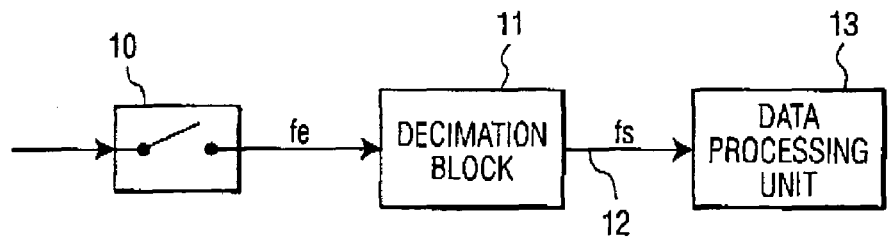
FIG. 1 is a block diagram showing an example of a receiver according to the invention.

FIG. 1 is a simplified block diagram of a receiver according to the invention. It comprises at least:
- a receiver block 10 for receiving analog data and providing samples at an input frequency fe,
- a decimation block 11 for generating data at an output frequency fs, with fs<fe, which is predetermined as a function of the desired symbol frequency in the envisaged application, on the basis of input samples received at the frequency fe,
- a connection or communication link 12 for transferring the data generated with the output frequency fs by the decimation device 11 to another component in the receiver, in particular to a data processing unit 13.

The decimation device 11 is provided for generating data with the output frequency fs in time slots or periods reserved on the connection line 12 in accordance with a previously defined periodic schedule. No conflict can thus arise since the total of the communications is arranged in advance. This static schedule can be used unchanged as long as the calculation flow generated by the envisaged application is predictable and independent of the transmitted data. By contrast, if the calculation flow is not completely periodical because the symbol frequency may vary over a major range of values as a function of the envisaged application, the purely static schedule is no longer applicable.

It is accordingly the object of the invention to introduce a degree of dynamism into an architecture of the static type so as to manage the symbol frequencies of a large number of applications, such as cable or satellite transmissions. To achieve this, the invention provides means for preventing the processing of the transmitted data, derived from input samples, at the level of the processing members situated downstream of the decimation device according to the invention, in certain predetermined communication time slots from among the reserved slots. To be able to comply with all requirements of the various applications as regards the symbol frequency at the output of the receiver, the allocation frequency for the reserved time slots must be determined as a function of the maximum symbol frequency desired by the total of the envisaged applications. For cable transmissions, for example, the maximum symbol frequency is equal to 7 MHz, and for satellite transmissions it is equal to 32 MHz.

Once the reservation frequency of the communication slots has been determined as a function of the highest symbol frequency, the decimation device is provided so as to generate data in the reserved slots at a suitable frequency, this time as a function of the symbol frequency demanded by the current application. To achieve this, the decimation device comprises means for reducing the output frequency of the valid data which are to be treated subsequently by processing members as determined by the application.

Figure 2:
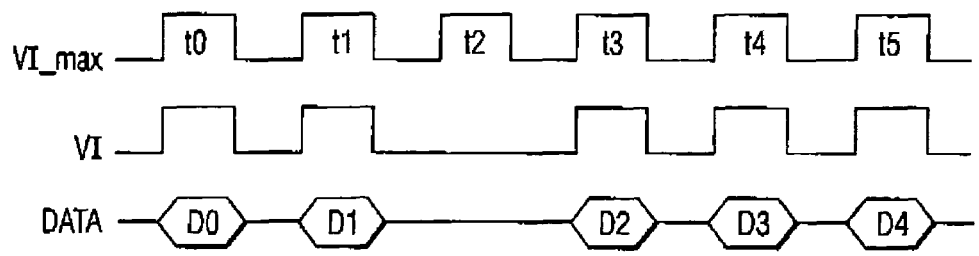
FIG. 2 is a diagram showing the various signals used in a receiver according to the invention.

In a preferred embodiment of the invention which generates signals represented diagrammatically in FIG. 2, the decimation device comprises means for associating a flag, referred to as validity flag, to the data transmitted in the reserved communication slots so as to indicate to the members for subsequent processing whether the transmitted data are "valid", i.e. can be used. The interest of the "valid" bit is that it renders it possible to retain a static architecture in an application in which certain functions or calculations depend on the transmitted data. In the diagram of FIG. 2:

the signal VI_max represents the communication slots numbered t0 to t5 reserved in accordance with a periodic allocation schedule as a function of the maximum symbol frequency envisaged, the signal VI represents the "valid" flag associated with the data transmitted in each communication slot, the signal DATA represents the data, written D0 to D4, transmitted towards processing members for which they are destined.

Said processing members for which these data are destined in their turn must be capable of detecting and decoding the "valid" flag. To achieve this, the decimation device may generate the "valid" flag in the following manner:

if a valid data is transmitted or produced in the form of a result which can be used by a processing member, the flag is given, for example, the value 1, on the other hand, if no result is produced or no data is transmitted, the flag is given, for example, the value zero.

The flag follows the same path as the data for which it gives a validity indication. For example, the multiplexers do not distinguish between a data validated by a flag with value 1 and a non-valid data whose flag is at zero. The same holds for the registers. By contrast, the valid flag may play a part in the data processing for the processing members or calculation members provided with processors which function by means of control programs. The program then must be capable of detecting the flag so as to deliver an appropriate instruction to the relevant processing member. In the case of a filter, for example, which receives data accompanied by a "non-valid" flag, the associated program will block the instruction, so that the data are not processed.

Figure 3:
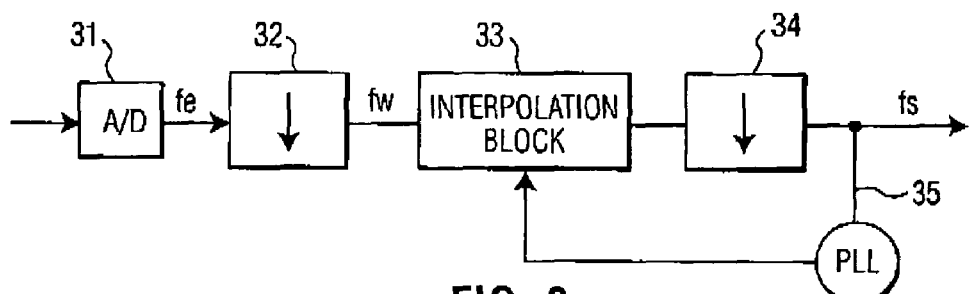
FIG. 3 is a diagram showing a decimation device according to the invention.

FIG. 3 shows, by way of example of an application, a programmable decimation device in an embodiment of the invention which is particularly suitable for a digital television receiver or set top box for demodulating digital data frames received through various transmission channels, in particular by cable, satellite, radio waves, etc. The receiver comprises:

an analog/digital converter 31 for sampling an input signal at a sampling frequency fe, a first processing block 32 for processing the received samples and delivering new samples at a frequency fw, fe being a multiple of fw and fw<fe, which block comprises an anti-aliasing filter for realizing a reduction by 2 of the input frequency of the filter (the sampling frequency fe) and for avoiding the aliasing problems introduced by the decimation, an interpolation block 33 for realizing an incomplete decimation of the input frequency fw and generating a frequency which is double the symbol frequency fs, a second processing block 34 comprising a Nyquist filter for eliminating the inter-symbol interference introduced by the decimation, and means for dividing by 2 for generating data at the symbol frequency, a phase locking loop PLL for realizing a counter-reaction 35 between the output of the Nyquist filter 34 and the interpolator 33 so as to adapt in real time the frequency generated by the interpolator as a function of the frequency measured at the output of the Nyquist filter and of the desired output frequency fs.

In the embodiment shown by way of example in FIG. 3, the decimation device according to the invention is formed by the blocks 32, 33 and 34 and the counter-reaction loop 35.

Figure 4:
FIG. 4 shows an example of a transmission system according to the invention.

FIG. 4 is a general diagram of a transmission system according to the invention comprising a transmitter 41, a receiver 42 of the type as shown in FIG. 1, and a transmission channel 43 which provides, for example, satellite links, cable transmissions, radio waves, etc.

The invention claimed is:

1. A transmission system comprising:
   at least a transmitter and a receiver,
   said receiver comprising a decimator for generating data at a symbol frequency based on input samples which have an input frequency higher than the symbol frequency,
   wherein the generated data is transmitted using a fraction of communication slots that are reserved periodically based on a predicted maximum symbol frequency.

2. A transmission system as claimed in claim 1, wherein said decimator transmits validity information associated with the data transmitted in said reserved slots.

3. A transmission system as claimed in claim 2, the decimator generating data destined for at least one processing unit controlled by a control member, wherein said control member comprises a detector for detecting said validity information so as to prevent processing of associated data by said processing unit.

4. A receiver comprising:
   a decimator for generating data at a symbol frequency based on input samples which have an input frequency higher than the symbol frequency, wherein the generated data is transmitted using a fraction of communication slots that are reserved periodically based on a predicted maximum symbol frequency.

5. A receiver as claimed in claim 4, wherein said decimator adds validity information to the data transmitted in said reserved slots.

6. A receiver as claimed in claim 5, the decimator generating data at the symbol frequency for at least one processing unit controlled by a control member, wherein said control member comprises a detector for detecting said validity information so as to prevent processing of associated data by said processing unit.

7. A decimation device comprising:
means for generating data at a symbol frequency based on input samples which have an input frequency higher than the symbol frequency, and
means for processing the generated data,
wherein the generated data is transmitted using a fraction of communication slots that are reserved periodically based on a predicted maximum symbol frequency.

8. A device as claimed in claim 7, wherein said device comprises means for transmitting validity information associated with the data transmitted in said reserved slots.

9. A device as claimed in claim 8, the means for processing comprising at least one processing unit controlled by a control member, wherein said control member comprises detection means for detecting said validity information so as to prevent processing of associated data by said processing unit.

10. A method for operating a transmission system comprising at least a transmitter and a receiver, said method comprising the steps of:
generating data in a decimator in said receiver at a symbol frequency based on input samples which have an input frequency higher than the symbol frequency; and
transmitting the generated data using a fraction of communication slots that are reserved periodically based on a predicted maximum symbol frequency.

11. A method as claimed in claim 10 further comprising the step of:
transmitting from said decimator validity information associated with the data transmitted in said reserved slots.

12. A method as claimed in claim 11, wherein transmitting the generated data comprises transmitting the generated data to at least one processing unit controlled by a control member, said data comprising said validity information, and further comprising the steps of:
detecting said validity information in said control member; and
preventing processing of associated data by said processing unit when said validity information is detected by said control member.

13. A method as claimed in claim 10, said method further comprising the step of:
operating said transmission system in one of: a broadband digital communication application, a digital television application, a channel decoding application and a demodulation application.

14. A method for operating a receiver comprising a decimator in a transmission system, said method comprising the steps of:
generating data in said decimator in said receiver at a symbol frequency based on input samples which have an input frequency higher than the symbol frequency; and
transmitting the generated data using a fraction of communication slots that are reserved periodically based on a predicted maximum symbol frequency.

15. A method as claimed in claim 14 further comprising the step of:
transmitting from said decimator validity information associated with the data transmitted in said reserved slots.

16. A method as claimed in claim 15, wherein transmitting the generated data comprises transmitting the generated data to at least one processing unit controlled by a control member, said data comprising said validity information, and further comprising the steps of:
detecting said validity information in said control member; and
preventing processing of associated data by said processing unit when said validity information is detected by said control member.

17. A method as claimed in claim 14, said method further comprising the step of:
operating said transmission system in one of: a broadband digital communication application, a digital television application, a channel decoding application and a demodulation application.

18. A method for operating a decimation device in a transmission system, said method comprising the steps of:
generating data in said decimation device at a symbol frequency based on input samples which have an input frequency higher than the symbol frequency; and
transmitting the generated data using a fraction of communication slots that are reserved periodically based on a predicted maximum symbol frequency.

19. A method as claimed in claim 18 further comprising the step of:
transmitting from said decimation device validity information associated with the data transmitted in said reserved slots.

20. A method as claimed in claim 19, wherein transmitting the generated data comprises transmitting the generated data to at least one processing unit controlled by a control member, said data comprising said validity information, and further comprising the steps of:
detecting said validity information in said control member; and
preventing processing of associated data by said processing unit when said validity information is detected by said control member.

* * * * *